(12) United States Patent
Simpson

(10) Patent No.: US 7,889,191 B2
(45) Date of Patent: Feb. 15, 2011

(54) METHOD AND APPARATUS FOR PROVIDING A SYNCHRONIZED VIDEO PRESENTATION WITHOUT VIDEO TEARING

(75) Inventor: Miles S. Simpson, Belmont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1110 days.

(21) Appl. No.: 11/566,022

(22) Filed: Dec. 1, 2006

(65) Prior Publication Data

US 2008/0129868 A1     Jun. 5, 2008

(51) Int. Cl.
*G06F 3/038* (2006.01)
(52) U.S. Cl. ..................... 345/213; 345/204
(58) Field of Classification Search ........... None
See application file for complete search history.

(56) References Cited

U.S. PATENT DOCUMENTS

| | | | | |
|---|---|---|---|---|
| 5,798,762 A | * | 8/1998 | Sfarti et al. ............ | 345/420 |
| 5,818,468 A | * | 10/1998 | Le Cornec et al. ........ | 345/535 |
| 6,181,300 B1 | * | 1/2001 | Poon et al. ............ | 345/698 |
| 6,441,812 B1 | | 8/2002 | Voltz | |
| 2004/0246242 A1 | * | 12/2004 | Sasaki .................. | 345/204 |
| 2005/0078620 A1 | * | 4/2005 | Balachandran et al. ..... | 370/313 |
| 2005/0184993 A1 | | 8/2005 | Ludwin et al. | |
| 2005/0259694 A1 | | 11/2005 | Garudadri et al. | |
| 2005/0264574 A1 | * | 12/2005 | Shimomura et al. ........ | 345/531 |
| 2006/0013208 A1 | | 1/2006 | Rietschel et al. | |
| 2006/0171414 A1 | | 8/2006 | Katibian et al. | |
| 2006/0262809 A1 | * | 11/2006 | Gong et al. ............. | 370/466 |

* cited by examiner

*Primary Examiner*—Amare Mengistu
*Assistant Examiner*—Matthew Yeung
(74) *Attorney, Agent, or Firm*—Pillsbury Winthrop Shaw Pittman LLP

(57) ABSTRACT

The present invention provides a method and apparatus for feeding a video stream from a video source in a manner that prevents video tearing.

26 Claims, 4 Drawing Sheets

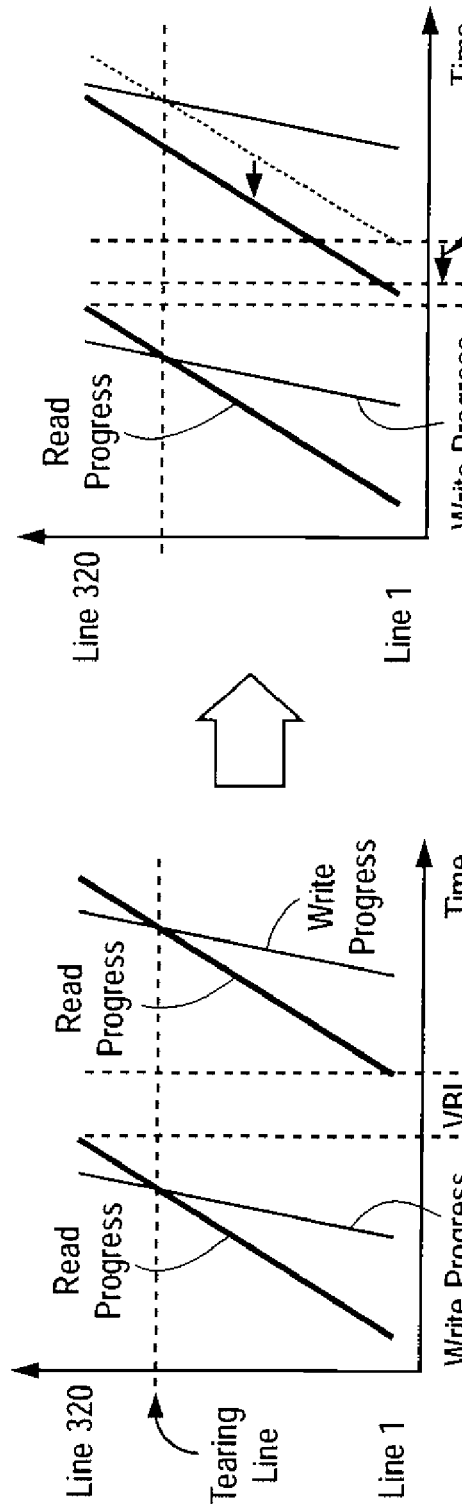
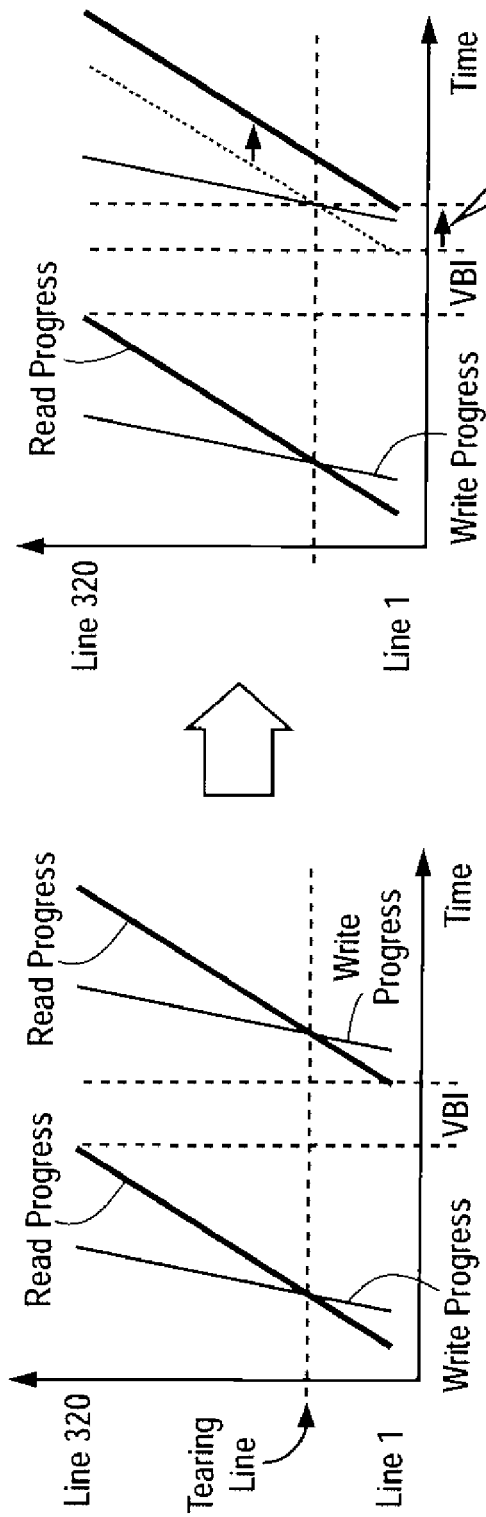
FIG. 2A  FIG. 2B  FIG. 2C  FIG. 2D

METHOD AND APPARATUS FOR PROVIDING A SYNCHRONIZED VIDEO PRESENTATION WITHOUT VIDEO TEARING

FIELD OF THE INVENTION

The present invention provides a method and apparatus that provides for a synchronized video presentation. More particularly, the present invention provides a method and apparatus for presenting the images of a video stream from a video source in a manner that prevents video tearing.

BACKGROUND OF THE INVENTION

It is known to present video in a manner in which the video frames are synchronized.

For synchronization of uncompressed video frames, it is known to use a host that transmits the frames to a synchronization control unit, which synchronization control unit is associated with the display device. If synchronization is lost, the synchronization control unit of the display controller will send a control signal back to the host in order to regain synchronization. An example of such a system is found in U.S. Published Application No. 2005/0184993 1.

There are also other systems for producing synchronization of streamed data. Two examples are discussed in U.S. Published Application Nos. 2002/6441812 and 2006/0013208. In both of these systems, synchronization is maintained, and in 2002/6441812 video tearing is prevented, using of a reference clock derived from a host clock in a synchronization control unit of the display controller. As a result, communication with the host is necessary, which thus complicates.

It would be advantageous to create a display controller that does not require communication with the host in order to operate effectively.

SUMMARY OF THE INVENTION

The present invention provides a method and apparatus for presenting images of a video stream from a video source in a manner that prevents video tearing.

In one aspect of the invention there is provided a method of and apparatus for providing a video presentation from a host to a display device that does not have internal frame memory, the video presentation including a plurality of video frames.

In a particular aspect, the method comprising sequentially receiving from the host each of the plurality of video frames; and while the step of sequentially receiving continues, sequentially presenting each of the plurality of video frames to the display device without the usage of a reference clock derived from a host clock, where a remaining plurality of video frames after an initial set of video frames are presented so that each of a remaining plurality of the plurality of video frames are received by the display device in a manner that reduces video drift and prevents visual side effects.

In a further aspect, the sequentially presenting includes adjusting a display frame rate during the initial set of video frames to provide phase alignment.

In a further aspect, the sequentially presenting includes adjusting a display frame rate to match the host frame rate on all frames received from the host after phase alignment has been achieved.

In a still further aspect, the adjusting includes altering at least one blanking interval, and in a particular aspect particularly a vertical blanking interval.

In yet another aspect, the present invention provides an apparatus that includes a means for sequentially receiving from the host each of the plurality of video frames; and a means for sequentially presenting each of the plurality of video frames to the display device without the usage of a reference clock derived from a host clock.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIGS. 2(a)-2(d) are timing diagrams that illustrate operation of the present invention.

DETAILED DESCRIPTION OF THE PREFERRED EMBODIMENTS

Figure 1:
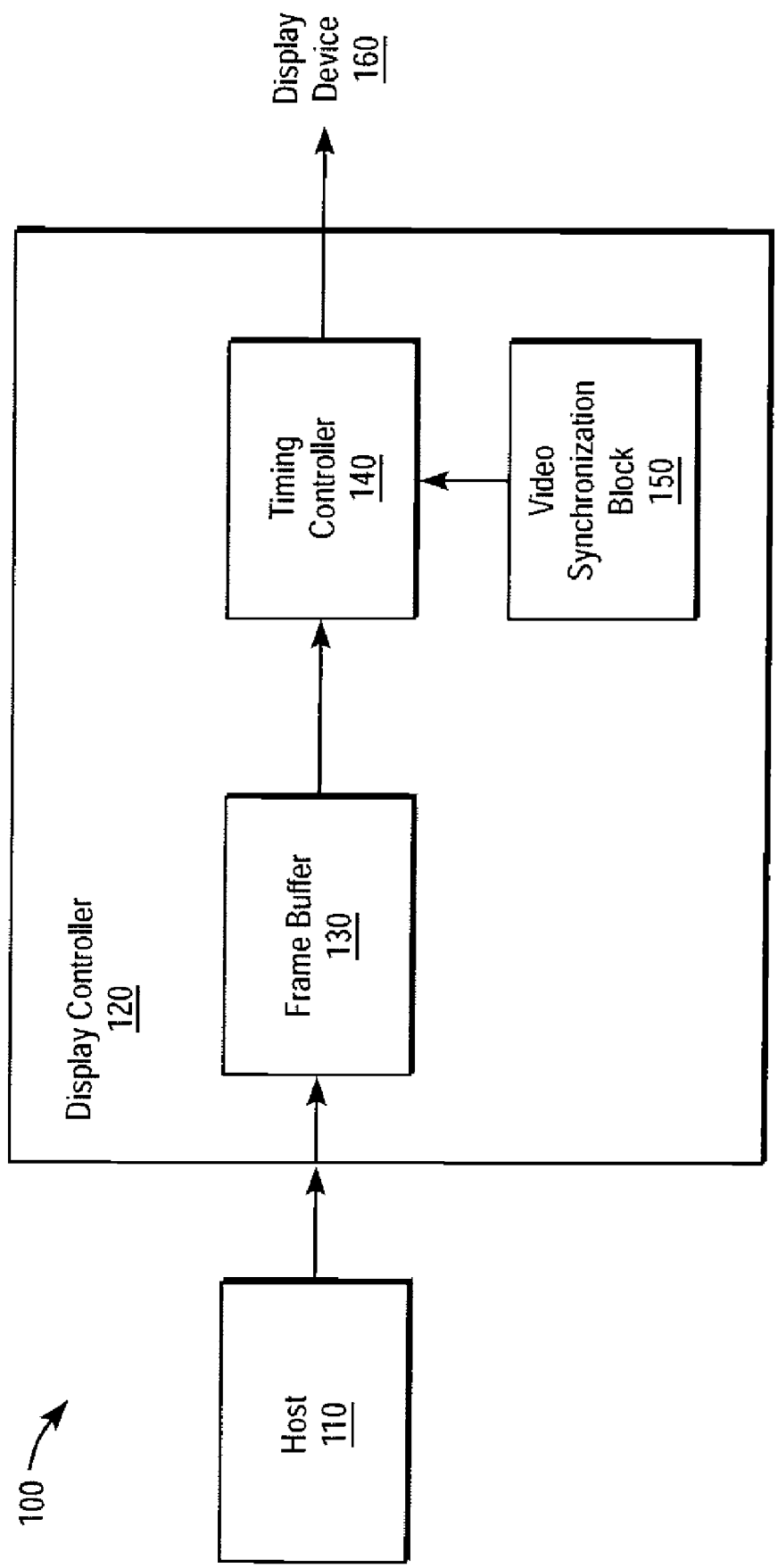
FIG. 1 illustrates a block diagram of a system including the present invention.

FIG. 1 illustrates a block diagram of a system 100 that includes a host 110, a display controller 120, a video synchronization block 150, and a display 160. The display 160 includes an LCD driver that does not include any RAM memory. The display controller 120 includes a frame buffer 130, a timing controller 140 (conventionally known as a TCON), and a video synchronization block 150.

The host 110 acts as the source of pixels where pixels are arranged into host video frames. A host video frame contains all the pixels necessary to construct one image. Host video frames are arranged so that when displayed consecutively they form a video sequence of images.

Before describing further specifics regarding the invention, it is mentioned that the apparatus and method described herein are particularly well suited for providing synchronization in the context of an architecture based on the MDDI specification where the display controller 120 acts as the MDDI client and the video source host 110 acts as the MDDI host. The invention is also suited for implementations in the context of an architecture based on the MIPI specifications. The display 150 may act as the display device or module on the MIPI DPI interface with the display controller 120 acting as the display driver. The display controller 120 may act as the peripheral on the MIPI DSI interface while the video source host 110 acts as the host. Alternatively, the display controller 120 may act as the display module on the MIPI DBI interface while the video source host 110 acts as the host processor. MDDI is the Video Electronics Standards Association (VESA) standard for the Mobile Display Digital Interface (MDDI)—MIPI is the Mobile Industry Processor Interface defined by the MIPI Alliance.

As is illustrated in FIG. 1, the frame buffer 130 receives the host video frames arriving from the host 110 and stores the host video frames. It is also understood and known that pixels make up each of the host video frames. It is also understood and known that the host video frames have a consistent frame rate associated therewith. By consistent frame rate is meant that the video frames are intended to be displayed consecutively and with an identical period therebetween.

One aspect of the present invention derives from an appreciation that due to non-ideal circuit elements, such as clocks, that skew, noise and other undesired artifacts and irregularities are typically introduced into display systems, particularly display systems that are constructed in an economical manner using lower cost components. As a result, while host video frames have a consistent frame rate associated therewith are desired, in practice it is difficult to achieve such consistency.

It should also be appreciated that in display systems, the frames that are sent from the host are not necessarily sent with all of the same timing characteristics associated with a TCON thereon. For example, the frames as sent out from a host 110 do not necessarily have a VBI (Vertical Blanking Interval) set between them, during which interval no pixel data associated with the frame exists. Rather, the last pixel of a host frame may be followed immediately by the first pixel of the next host frame, or not. On the other hand, a vertical blanking interval is typically introduced by the display controller 120. According to the present invention, as discussed hereinafter, it will not matter whether the host 110 introduces a VBI or not, as the vertical blanking interval is generated by the display controller 120.

The display controller 120 receives the stream of pixels that make up the host video frames from the host 110 and immediately writes them into the frame buffer 130. This frame buffer 130 can be configured in different ways. In one embodiment, the frame buffer 130 is a memory just large enough to store one host video frame. After one host video frame is written into the frame buffer 130, the next host video frame in the sequence over-writes the first one. In the preferred embodiment, the pixels are written into the frame buffer 130 in one order, typically "raster-scan" order, and that the pixels are read out by the timing controller 140 in the same order that they are written in from the host. Raster scan order refers to the first pixel being placed in the upper left-hand corner of the frame, and the next pixel goes to the right of the first pixel. This continues until the end of the first line. The next pixel is written to the left-most position on the next line down. Lines are written this way from top to bottom until the last line is written, as is known.

The timing controller 140," also illustrated as TCON in FIG. 1, reads pixels from this frame buffer 130 simultaneously as pixels are written in, after a first host video frame of pixels are received. The TCON reads them out in raster-scan order. After each pixel is read, it is sent to the display 160, which visually presents the pixels to the viewer. The ever-changing position in the frame buffer 130 at which each host pixel is written is tracked by the "write pointer". Likewise, the frame buffer position where the timing controller 140 is reading from is tracked by the "read pointer". After the timing controller 140 sends a frame of pixels to the display 160, it stops sending pixels for a period of time, which period of time is referred to as the vertical blanking interval, or VBI, as discussed above. Pixels for the next frame are sent immediately after the VBI.

The method of this invention assumes that the timing controller 140 read frame rate is close to the host write frame rate or close to a multiple of the host write frame rate, as detailed further below. The timing characteristics of the timing controller 140 according to the present invention are programmable so that its frame rate is flexible enough to be matched to host frame rate in this way.

Video tearing occurs when the write pointer passes the read pointer (or vice versa) during the active video, or non-VBI, portion of the TCON frame period, as shown in FIGS. 2(a) and 2(c). The method of this invention prevents tearing by synchronizing the TCON read frame timing with the host write frame timing, and by providing an appropriate fixed phase relationship between them. It does this by increasing or decreasing the duration of the VBI, essentially stretching or shrinking it, as illustrated in FIGS. 2(b) and 2(d), respectively.

There are two aspects to frame rate synchronization. They include frequency synchronization and phase alignment. The frequency of the TCON read frame rate is synchronized to the host write frame rate while at the same time a programmable phase alignment is maintained between the beginning of a TCON frame and the beginning of a host frame.

The TCON read frame rate must be close to the host write frame rate, but how close they must be is governed by the length of the VBI. A smaller VBI requires a TCON frame rate more closely matched with the host frame rate.

A TCON frame period is composed of a VBI and an active video interval. These components are further broken down into smaller units of time called "clock cycles". Both the VBI and the active video interval consist of some number of clock cycles. The VBI and active video intervals together represent the frame period. The number of clock cycles in a frame period is referred to as the "frame total".

Figure 3A:
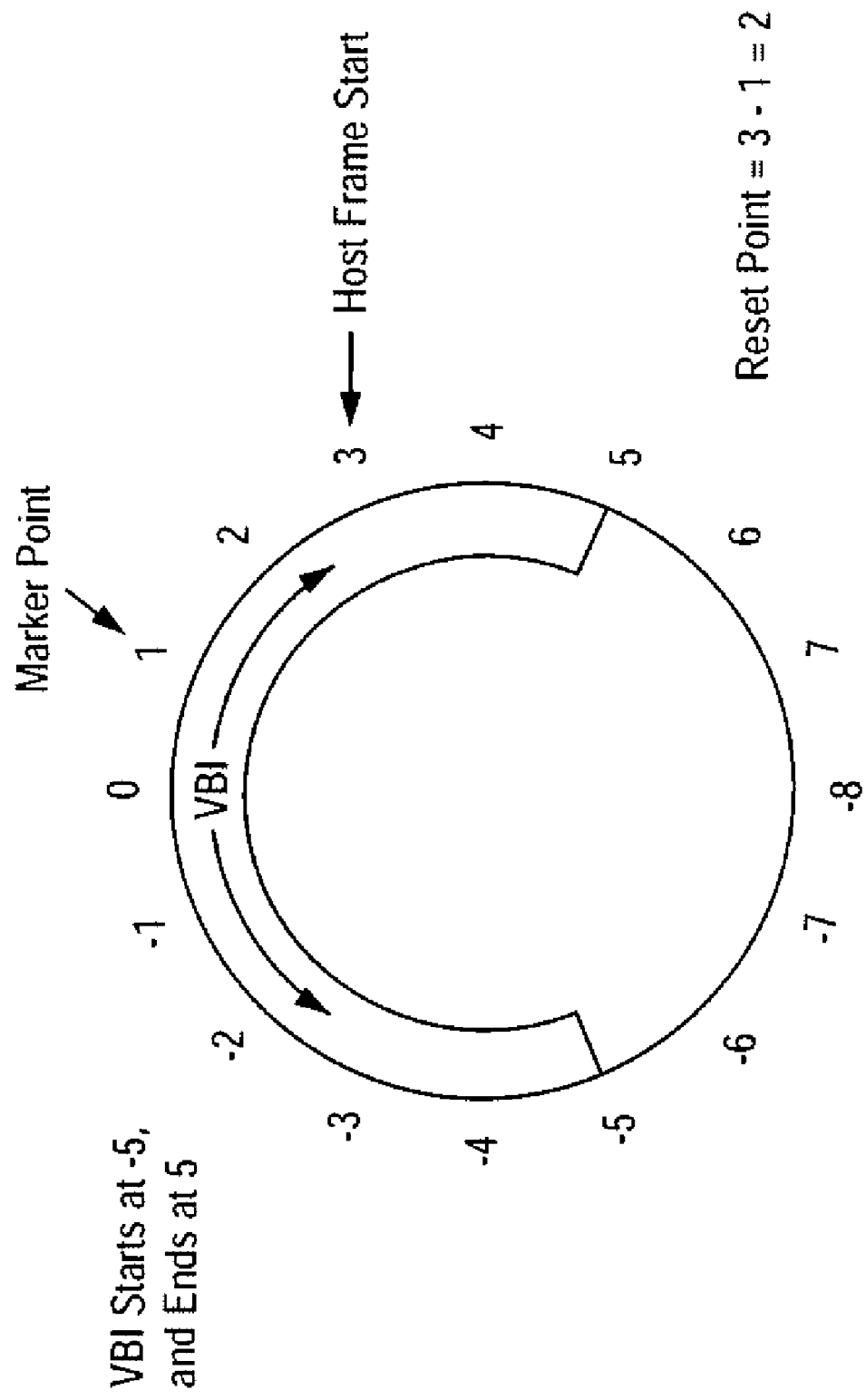
FIGS. 3(a) and 3(b) illustrate functional diagrams for an implementation of the method of operation for the present invention.
Figure 3B:
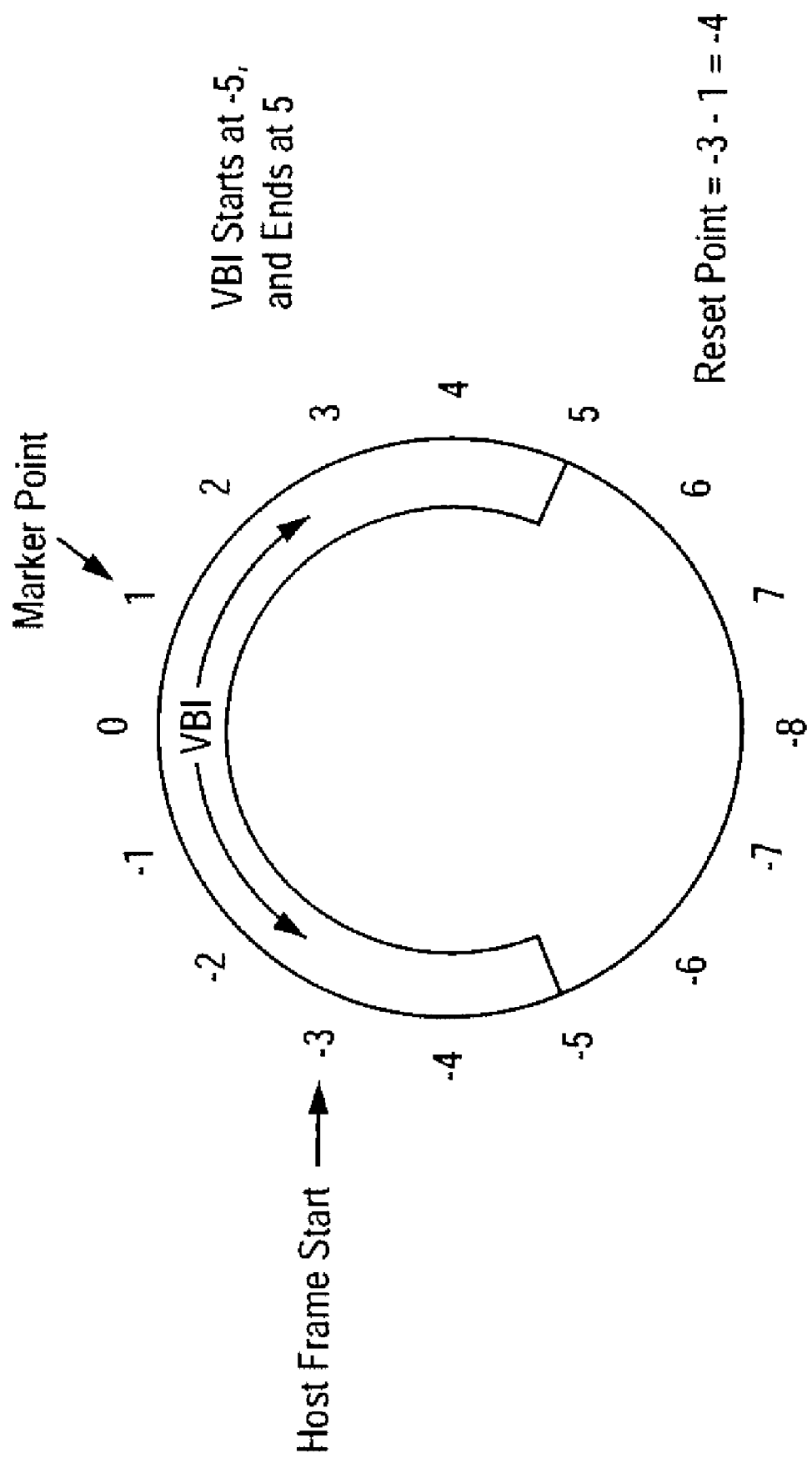

For conceptual purposes, FIGS. 3(a) and 3(b) illustrate functional diagrams of a timing wheel that illustrates the operation of the present invention. As shown, the clock cycles in a TCON frame period can be numbered and arranged on a wheel, called a timing wheel herein. The numbers on the right half of the wheel would be positive while the numbers on the left half would be negative. The number 0 is placed at the top of the wheel and the numbers 1, 2, 3, etc. are arranged clockwise down on the right side. The last positive number just to the right of the bottom of the wheel would be one less than half the frame total. The number at the bottom would be a negative number equal to half the frame total in absolute value. The numbers would count up from there (towards 0) clockwise on the left side of the wheel. The last number just to the left of the top would be −1. The number 0 would follow just to the right of −1.

The video synchronization block 150 according the present invention provides logic that implements the timing wheel as described herein. In particular, the video synchronization block 150 arranges the VBI around 0 at the top of the timing wheel such that 0 is located at the center of the VBI. The rest of the numbers outside the VBI represent the active video interval. The bottom of the timing wheel coincides with the pixel at the center of the video image. The state of the TCON frame period is represented in time by progressing clockwise around the wheel. Pixels are read from the frame buffer 130 only during the active video interval.

The "marker point" represents the programmable phase alignment component of frame rate synchronization. It points to a clock cycle on the timing wheel where the first pixel from the each host frame will arrive after frame synchronization has been achieved.

When the video synchronization block 150 first starts running, the first host frame pixel will arrive at some arbitrary point on the timing wheel. When it does arrive, that point is labeled "host frame start". The numerical difference between the host frame start and the marker point is calculated to produce a new number called the "reset point". Time will progress clockwise around the wheel until the VBI is reached on the left side. The clock cycle at this point on the wheel will have some negative number associated with it. If the reset point is between this and the positive number on the other side marking the end of the VBI, a reset will be generated as soon as the clock cycle on the wheel matches the reset point, and the reset is then output to the timing controller 140. This reset will start the timing wheel at 0 and will force the timing controller 140 to the corresponding state at the center of its VBI. This will cause the marker point to align with the host frame start point, as time progresses, the next time that cycle is reached.

For a stretch example, reference is made to FIG. 3(a), the host frame start occurs at clock cycle 3. In this example the VBI ranges from −5 through 0 to +5. The reset point is calculated to be 2 just after the first host frame pixel arrives. The state of the TCON moves clockwise around the wheel and the following cycles are encountered: 4, 5, 6, 7, −8, −7, −6, −5, −4, −3, −2, −1, 0, 1, 2. When clock cycle 2 is reached a reset is generated forcing the timing wheel back to 0 and the TCON back to the corresponding state at the center of its VBI. This has the effect of creating a longer than normal VBI and also of aligning the marker point at clock cycle 1 with the host frame start.

For a shrink example, reference is made to FIG. 3(b), the host frame start occurs at clock cycle −3. Again, the VBI ranges from −5 to +5. The reset point is immediately calculated to be −4. Timing wheel clock cycles continue as time passes: −2, −1, 0, 1, 2, 3, 4, 5, 6, 7, −8, −7, −6, −5, −4. When clock cycle 4 is reached a reset is generated forcing the timing wheel back to 0 and the TCON back to the corresponding state at the center of its VBI. This has the effect of creating a shorter than normal VBI and also aligning the marker point at clock cycle 1 with the host frame start.

A different approach is taken in the case where the reset point is outside the numbers in the VBI region at the top of the wheel. If for example the reset point is a positive number greater than the cycle at the end of the VBI, a reset will be generated at the last clock cycle of the VBI (on the right side of the timing wheel). Reference is made to FIG. 3(a), a host frame start occurring on clock cycle +7 would result in a reset point of +6 which would serve as an example of such a positive number greater than 5 which marks the end of the VBI. The reset would be generated at 5. If the reset point is a negative number less than the number at the beginning of the VBI, a reset will be generated at the first clock cycle of the VBI (on the left side of the timing wheel). Reference is made to FIG. 3(a), a host frame start occurring on clock cycle −6 would result in a reset point of −7 which would serve as an example of such a negative number less than −5 which marks the beginning of the VBI. The reset would be generated at −5. As soon as this reset has been generated, the current clock cycle number is subtracted from the reset point. This new number then becomes the new reset point and the old reset point is discarded. If the reset point were −7 then the reset would be generated at the arrival of −5 and −5 would be subtracted from −7 resulting in −2. Another frame will pass and the process is repeated on the next VBI with the new reset point. This continues until this changing reset point becomes equal a number that does lie in the VBI. With a new reset point of −2, a reset would be generated on clock cycle −2 in the next VBI. Once a reset is generated during this last VBI, the marker point and the host frame start point will align with each other. If at any time during this process a host frame start is encountered, this decreasing reset point is discarded and replaced with the numerical difference between the clock cycle (at the host frame start) and the marker point.

Thus, as described above, the present invention attempts to synchronize by maintaining a fixed phase relationship between the center of the TCON's VBI and the first pixel of the host's frame. Thus, in certain preferred embodiments, by varying the VBI the effect is to vary the over-all TCON frame period so that the overall TCON frame period matches the host's. Varying the VBI is really just an implementation detail. Other manners that may be used to vary the TCON frame period to match that of the host, without the use of a reference clock derived from a host clock, are within the intended scope of the invention.

It should be noted, however, that while synchronization is described as being kept by altering the timing of the vertical blanking interval, it will be appreciated that altering the timing of the horizontal blanking interval, or a combination of the vertical and horizontal blanking intervals can be made in order to achieve synchronization (also referred to as frame lock). When altering blanking intervals, what is required is periodically changing timing during an interval within each frame where timing could be altered in a way that would not result in visual side effects on the display. These timing changes can occur as little or as much as is needed.

It should also be noted that the timing controller 140 and the video synchronization block 150 are programmable so that a variety of frame rates ARE maintained. They must be tuned so that the timing controller frame rate is "close" to the host's frame rate, but not necessarily exactly matching the host's frame rate.

The timing controller 140 and video synchronization block 150 may also be programmed so that the timing controller frame rate is "close" to a multiple of the host's frame rate. For example, if the hosts frame rate is 24 frames per second, the timing controller frame rate could be programmed so that it refreshes the display at a rate of 48 or 72 frames per second. As long as the two are close in frame rates or multiples, this method of resetting the timing controller frame rate periodically during its VBI will result in frequency/phase lock between the timing controller frame rate and the host frame rate.

The characteristics of the display also come into play as far as TCON refresh rates are concerned. Some displays will have more noticeable flicker if they are refreshed at low frame rates. This is why it is important that the TCON may be allowed to run at a multiple of the host's frame rate.

Variations on the invention described above are intended within the scope of the invention. For example, while the buffer memory may store an entire frame or more, the memory can also be implemented as a FIFO memory holding less than a full frame of pixels. Thus, if the host sends video continuously and never stops sending video, then a memory smaller then a frame could be used to buffer the pixels, which memory could be a FIFO or other kind of small buffer. A frame buffer would be used, however, if the host sends a sequence of frames (or even just one frame) then stops sending frames, since the display controller must continue to present the image in the frame buffer over and over so that the viewer sees that image on the display until a next image arrives. This frame buffer would require memory to hold at least one frame, as the display controller would not be able to present a full image to the display if less than the full frame was stored. Another aspect of the invention it that in addition to frame period alteration, the present invention can be implemented so that a fixed phase offset between the video source and the display refresh device would also be maintained, which is advantageous for implementations in which phase alignment is a separate process.

Although the present invention has been particularly described with reference to embodiments thereof, it should be readily apparent to those of ordinary skill in the art that various changes, modifications and substitutes are intended within the form and details thereof, without departing from the spirit and scope of the invention.

Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of providing a video presentation from a host to a display device that does not have internal frame memory, the video presentation including a plurality of video frames, the method comprising the steps of:
   sequentially receiving from the host each of the plurality of video frames;
   while the step of sequentially receiving continues, sequentially presenting each of the plurality of video frames to the display device without the usage of a reference clock derived from a host clock, where a remaining plurality of video frames after an initial set of video frames are presented so that each of a remaining plurality of the plurality of video frames are received by the display device in a manner that reduces video drift and prevents video tearing in each of the remaining plurality of video frames, wherein the step of sequentially presenting uses an algorithm based on a timing wheel in order to maintain synchronization, and wherein where all clock cycles which make up the frame are represented as positive numbers on a right side of the timing wheel and negative numbers on a left side of the timing wheel.

2. The method according to claim 1 wherein the step of sequentially presenting includes the step of adjusting a display frame rate during the initial set of video frames to provide synchronization.

3. The method according to claim 2 wherein the step of adjusting includes a step of altering at least one blanking interval.

4. The method according top claim 3 wherein the step of adjusting alters a vertical blanking interval.

5. The method according top claim 3 wherein the step of adjusting alters a vertical blanking interval and at least one horizontal blanking interval.

6. The method according top claim 3 wherein the step of adjusting alters at least one horizontal blanking interval.

7. The method according to claim 2 wherein the step of sequentially receiving receives the plurality of video frames at a host frame rate, and the step of sequentially presenting displays the remaining plurality of video frames so that display frame rate matches the host frame rate.

8. The method according to claim 7 wherein the step of sequentially presenting maintains, for the remaining plurality of video frames, a fixed phase offset between the remaining plurality of video frames and those corresponding frames as received during the step of receiving.

9. The method according to claim 1, wherein the step of receiving uses a memory to receive each of the plurality of video frames.

10. The method according to claim 9 wherein the step of receiving implements the memory as one of a frame buffer that holds one or more frames, a FIFO and a buffer memory that holds less than one frame.

11. The method according to claim 1 wherein the step of sequentially receiving and sequentially presenting are performed by an MDDI client display controller.

12. The method according to claim 1 wherein the step of sequentially receiving and sequentially presenting are performed by a MIPI peripheral display controller or a MIPI display driver or module.

13. The method according to claim 1 wherein the step of sequentially presenting achieves synchronization for the remaining set of video frames by causing a read pointer associated with a memory not to cross a write pointer associated with the memory, wherein crossing of the read pointer and the write pointer would result in video tearing.

14. An apparatus for providing a video presentation from a host to a display device that does not have internal frame memory, the video presentation including a plurality of video frames, the apparatus comprising:
   means for sequentially receiving from the host each of the plurality of video frames; and
   means for, while the step of sequentially receiving continues, sequentially presenting each of the plurality of video frames to the display device without the usage of a reference clock derived from a host clock, where a remaining plurality of video frames after an initial set of video frames are presented so that each of a remaining plurality of the plurality of video frames are received by the display device in a manner that reduces video drift and prevents visual tearing in each of the remaining plurality of video frames, wherein the means for sequentially presenting uses an algorithm based on a timing wheel in order to maintain synchronization, and wherein where all clock cycles which make up the frame are represented as positive numbers on a right side of the timing wheel and negative numbers on a left side of the timing wheel.

15. The apparatus according to claim 14 wherein the means for sequentially presenting includes means for adjusting a display frame rate during the initial set of video frames to provide synchronization.

16. The apparatus according to claim 15 wherein the means for adjusting alters at least one blanking interval.

17. The apparatus according top claim 16 wherein the means for adjusting alters a vertical blanking interval.

18. The apparatus according top claim 17 wherein the means for adjusting alters a vertical blanking interval and at least one horizontal blanking interval.

19. The apparatus according top claim 17 wherein the means for adjusting alters at least one horizontal blanking interval.

20. The apparatus according to claim 15 wherein the means for sequentially receiving receives the plurality of video frames at a host frame rate, and the means for sequentially presenting displays the remaining plurality of video frames so that display frame rate matches the host frame rate.

21. The apparatus according to claim 20 wherein the means for sequentially presenting maintains, for the remaining plurality of video frames, a fixed phase offset between the remaining plurality of video frames and those corresponding frames as received by the means for receiving.

22. The apparatus according to claim 14, wherein the means for receiving uses a memory to receive each of the plurality of video frames.

23. The apparatus according to claim 22 wherein the means for receiving implements the memory as one of a frame buffer that holds one or more frames, a FIFO and a buffer memory that holds less than one frame.

24. The apparatus according to claim 14 wherein the means for sequentially receiving and the means for sequentially presenting are performed by an MDDI client display controller.

25. The apparatus according to claim 14 wherein the means for sequentially receiving and the means for sequentially presenting are performed by a MIPI peripheral display controller or a MIPI display driver or module.

26. The apparatus according to claim 14 wherein the means for sequentially presenting achieves synchronization for the remaining set of video frames by causing a read pointer associated with a memory not to cross a write pointer associated with the memory, wherein crossing of the read pointer and the write pointer would result in video tearing.

* * * * *